United States Patent
Awoniyi-Oteri et al.

(10) Patent No.: US 11,234,189 B2
(45) Date of Patent: Jan. 25, 2022

(54) FIFTH GENERATION (5G) NEW RADIO (NR) NETWORK POWER SAVINGS

(71) Applicant: QUALCOMM INCORPORATED, San Diego, CA (US)

(72) Inventors: Olufunmilola Omolade Awoniyi-Oteri, San Diego, CA (US); Juan Montojo, San Diego, CA (US); Tao Luo, San Diego, CA (US); Wanshi Chen, San Diego, CA (US); Peter Pui Lok Ang, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/679,780

(22) Filed: Nov. 11, 2019

(65) Prior Publication Data

US 2020/0154354 A1    May 14, 2020

Related U.S. Application Data

(60) Provisional application No. 62/760,004, filed on Nov. 12, 2018.

(51) Int. Cl.
*H04W 52/02* (2009.01)
*H04W 80/08* (2009.01)
(Continued)

(52) U.S. Cl.
CPC ....... *H04W 52/0206* (2013.01); *H04W 72/14* (2013.01); *H04W 74/0833* (2013.01);
(Continued)

(58) Field of Classification Search
CPC . H04W 52/0206; H04W 76/27; H04W 72/14; H04W 74/0833; H04W 80/02; H04W 80/08
(Continued)

(56) References Cited

U.S. PATENT DOCUMENTS

| | | | |
|---|---|---|---|
| 7,110,765 B2 * | 9/2006 | Amerga | H04W 36/30 455/436 |
| 8,913,575 B2 * | 12/2014 | Pedersen | H04W 72/0426 370/329 |

(Continued)

FOREIGN PATENT DOCUMENTS

| | | |
|---|---|---|
| EP | 2991437 A1 | 3/2016 |
| EP | 3079418 A1 | 10/2016 |
| WO | 2016201638 A1 | 12/2016 |

OTHER PUBLICATIONS

International Search Report and Written Opinion—PCT/US2019/060896—ISA/EPO—dated Apr. 30, 2020.

*Primary Examiner* — Nghi H Ly
(74) *Attorney, Agent, or Firm* — Qualcomm IP Dept.; James Hunt Yancey, Jr.

(57) ABSTRACT

Wireless communications systems and methods related to network power saving are provided. In one embodiment, a base station (BS) of a wireless communication network determines to enter a sleep mode. The BS transmits, to one or more user equipment (UEs) of the wireless communication network, a communication signal indicating that the BS will enter the sleep mode. The BS operates in the sleep mode for a sleep mode period. In one embodiment, a UE receives, from a BS, a communication signal indicating that the BS will enter a sleep mode for a sleep mode period. The UE refrains, during one or more sleep windows of the sleep mode period, from performing uplink communications.

36 Claims, 8 Drawing Sheets

(51) Int. Cl.
　　　*H04W 72/14*　　　(2009.01)
　　　*H04W 80/02*　　　(2009.01)
　　　*H04W 76/27*　　　(2018.01)
　　　*H04W 74/08*　　　(2009.01)

(52) U.S. Cl.
　　　CPC .......... *H04W 76/27* (2018.02); *H04W 80/02* (2013.01); *H04W 80/08* (2013.01)

(58) Field of Classification Search
　　　USPC .................. 370/329, 328, 338; 455/574, 561
　　　See application file for complete search history.

(56) References Cited

U.S. PATENT DOCUMENTS

| | | | |
|---|---|---|---|
| 2010/0284321 A1* | 11/2010 | Zhang ............... | H04W 52/0216 370/312 |
| 2015/0245270 A1* | 8/2015 | Wu ....................... | H04W 24/02 370/331 |
| 2016/0309398 A1* | 10/2016 | Xue ....................... | H04W 48/14 |
| 2018/0049270 A1 | 2/2018 | Kubota et al. | |
| 2019/0082369 A1* | 3/2019 | Wu ....................... | H04W 4/027 |

\* cited by examiner

FIFTH GENERATION (5G) NEW RADIO (NR) NETWORK POWER SAVINGS

CROSS REFERENCE TO RELATED APPLICATIONS

The present application claims priority to and the benefit of U.S. Provisional Patent Application No. 62/760,004, filed Nov. 12, 2018, which is hereby incorporated by reference in its entirety as if fully set forth below and for all applicable purposes.

TECHNICAL FIELD

This application relates to wireless communication systems, and more particularly to reducing network power consumption and operational cost by allowing a network to enter a sleep mode in certain time periods.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Energy efficiency has been an important aspect in mobile communications on the user device side. For example, wireless communication protocols have been designed to allow sleep cycles to be incorporated at user devices to enable user devices to have a longer battery life. However, a significant portion of cellular network operational cost is attributed to power consumed by the infrastructure. The deployment of NR allowing for a higher data rate and a greater number of mobile users can further increase the infrastructure power cost. Further, NR allows for off-grid network deployments, enabling wireless connectivity to remote rural areas which may be powered by solar panels. Thus, there may be time periods when the network has a low power supply. As such, network energy performance is important for network operations.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms and techniques for network power saving by creating opportunities for a network to power down certain components or at least allow some components to operate in a low-power mode without disconnecting any connected user equipment (UE) or handing any UE over to a suboptimal BS. For instance, a BS may determine to enter a sleep mode and/or configure a network sleep/wake cycle based on uplink (UL) and/or downlink (DL) traffic needs and notify a UE of the start of the sleep mode and/or the sleep/wake cycle.

For example, in an aspect of the disclosure, a method of wireless communication, includes determining, by a base station (BS) of a wireless communication network, to enter a sleep mode. The method includes transmitting, by the BS to one or more user equipment (UEs) of the wireless communication network, a communication signal indicating that the BS will enter the sleep mode. The method includes operating, by the BS, in the sleep mode for a sleep mode period.

In an additional aspect of the disclosure, a method of wireless communication, includes receiving, by a user equipment (UE) from a base station (BS), a communication signal indicating that the BS will enter a sleep mode for a sleep mode period. The method includes refraining, by the UE during one or more sleep windows of the sleep mode period, from performing uplink communications. The method includes synchronizing, by the UE during at least one of the one or more sleep windows of the sleep mode period, timing with the BS.

In an additional aspect of the disclosure, a base station (BS) of a wireless communication network, includes a processor configured to determine to enter a sleep mode and operate in the sleep mode for a sleep mode period. The BS further includes a transceiver configured to transmit, to one or more user equipment (UEs) of the wireless communication network, a communication signal indicating that the BS will enter the sleep mode.

In an additional aspect of the disclosure, a user equipment (UE) includes a transceiver configured to receive, from a base station (BS), a communication signal indicating that the BS will enter a sleep mode for a sleep mode period. The UE further includes a processor configured to refrain, during one or more sleep windows of the sleep mode period, from performing uplink communications. The processor is further configured to synchronize, during at least one of the one or more sleep windows of the sleep mode period, timing with the BS.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
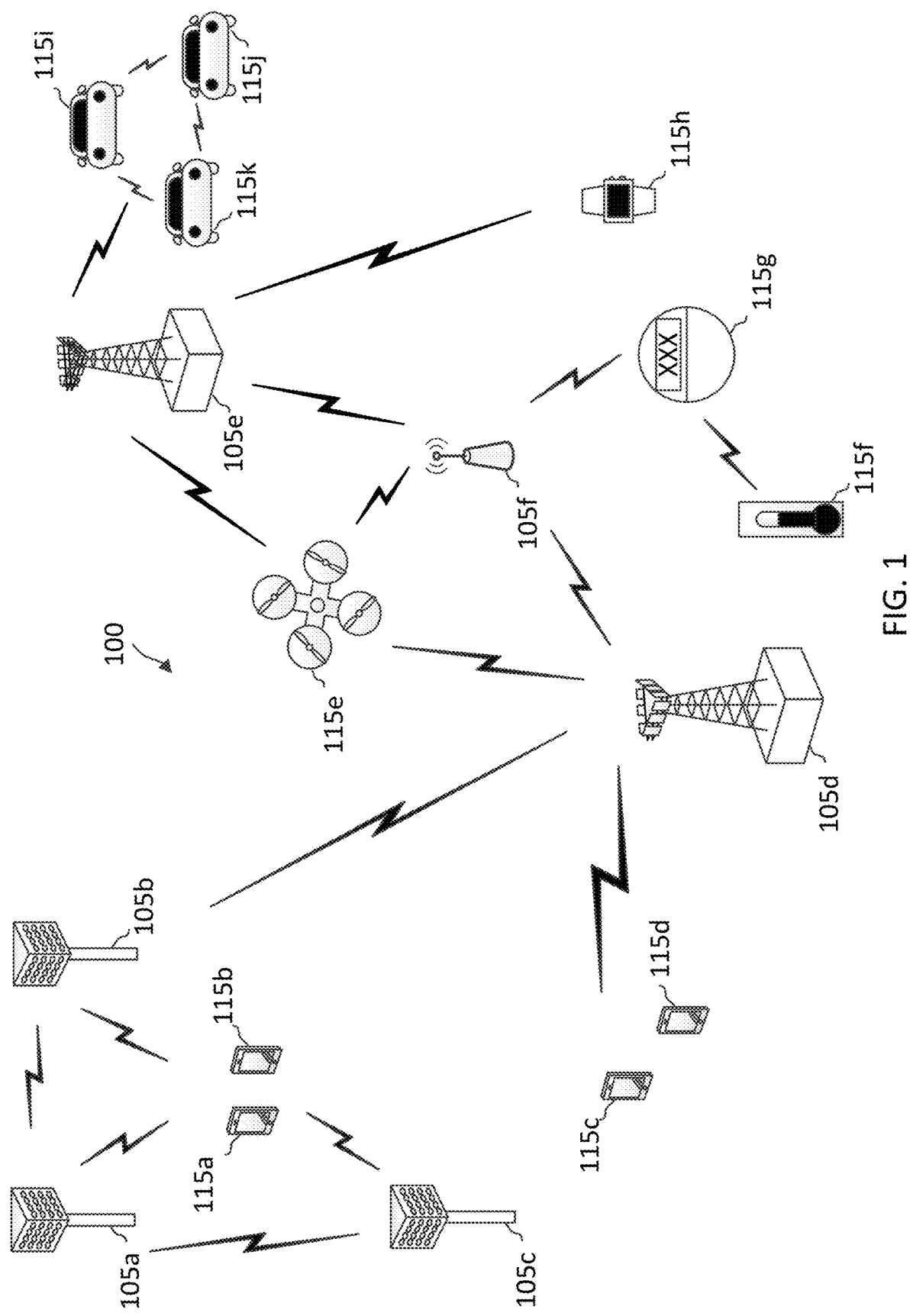
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Power savings on the network or infrastructure side have not been a major concern in the past. However, the recent advancements in wireless technologies allowing for more connected mobile devices and/or always-on devices have caused a need for power savings on the network side. Some wireless network deployments save power on the network side by powering down certain BSs in an area and handing over devices that are connected to the BSs that are to be powered down to other BSs that are remained powered on in the area. While such an approach may allow a network to save power, the UEs are required to be handover to other BSs which may not provide the best performance.

The present application describes mechanisms for network power savings by creating opportunities for a network to power down certain components or at least allow some components to operate in a low-power mode without disconnecting any connected UEs or handing over any UE to a suboptimal BS. In a wireless network, a BS may serve a number of connected UEs. In the DL direction, the BS has knowledge of when DL data arrived for a connected UE. The BS also has control of when to transmit the DL data to the UE. Thus, the BS can configure sleep periods according to the DL traffic needs. In the UL direction, UL data is generated by the UEs. In the disclosed embodiments, to allow the network or the BS to enter a sleep mode, the BS requests the connected UEs to report UL buffer statues (e.g., number of UL data bytes queued up at the corresponding UEs). The BS can determine when to enter a sleep mode and a duration of sleep periods based on UEs' UL buffer status reports. The BS may provide UL scheduling grants to the UEs prior to entering a sleep mode so that the UEs can empty their corresponding UL buffers prior to the BS entering the sleep mode. The BS may include one or more sleep periods and one or more awake periods while in the sleep mode. In some examples, the BS may include periodic sleep/awake cycles while in the sleep mode. Accordingly, the BS can power down some components during the sleep periods to save power. For example, the BS can power down at least some radio frequency (RF) components and/or at least some baseband (BB) components that are used for over-the-air (OTA) communications with the UEs. The BS may notify the connected UEs of the start of a sleep mode and an end of the sleep mode via signaling at various layers (e.g., at a physical layer, a media access control (MAC) layer, or a network layer). The BS may configure the UEs with the sleep pattern (e.g., the sleep/awake cycle) used for the sleep mode. Thus, the UEs can synchronize to the BS's sleep mode operations and refrain from transmitting UL communications (e.g., UL data and/or UL control) to the BS during the sleep periods.

In an embodiment, the BS may transmit DL synchronization signals during the sleep mode to allow the connected UEs to maintain synchronization with the BS and to allow new UEs seeking to join or access the network. The BS may reserve random access resources and/or allow some circuitry to be remained powered on for random access preamble monitoring.

In an embodiment, the BS may trigger a sleep mode without requesting UL data status reports from the connected UEs, for example, due to a critical low power supply. For example, the BS may operate in a rural area and may rely on solar power. Thus, during certain time periods, the power supply may be low. Accordingly, upon detecting a critical low power supply condition, the BS may broadcast a sleep mode start notification to all UEs in the area so that the UEs may refrain from transmitting UL communications to the BS.

Aspects of the present disclosure can provide several benefits. For example, the seeking of sleep opportunities by the BS can allow the BS to power down some components that may not be necessary to be always-on. The BS can take advantage of light UL traffic load condition to power down OTA components (e.g., for receiving UL traffic). The powering down of components in the sleep periods can save power consumption at the BS, and thus may reduce network operational cost. The signaling of the sleep mode allows a connected UE to synchronize to the sleep pattern of the BS and to refrain from transmitting UL communications to the BS instead of being handover to a suboptimal BS. The disclosed embodiments allow a network or BS to enter a sleep mode without causing any interrupt or at least a minimal interruption to connected UEs' operations. While the disclosed embodiments are described in the context of NR networks, the disclosed embodiments can be applied to any wireless communication networks to provide power savings and operational cost reductions. The disclosed embodiments are also suitable for use in a network powered by solar panel, where critical low power supply periods may occur.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The UE 115 may also report UL data status or UL buffer status to the BS 105. The BS 105 may schedule UL communications with the UE 115 based on the UE 115's UL data status report. The UE 115 may be referred to as an RRC connected UE when the UE 115 has an active connection with the BS 105.

When the network 100 includes many connected UEs 115 served by various BSs 105, the network 100 can consume a large amount of power to maintain the connections with the UEs 115. For example, a serving BS 105 may include radio frequency (RF) components and baseband (BB) components configured for over-the-air (OTA) communications with a connected UE 115. The serving BS 105 may also include other processing components configured for higher layer processing, for example, at a media access control (MAC) layer and/or at a network layer. The network 100 may also include other network components and servers (e.g., a serving gateway (SWG), a mobility management entity (MME), and/or various other core network components). The RF components, the BB components, the higher layer processing components, and/or the network components may consume power in maintaining connections with the UEs 115 and/or serving UL data and/or DL data to the UEs 115.

In an embodiment, the network 100 may seek or create opportunities to power down at least some of the RF components, BB components, higher layer processing component, and/or network components in the network 100 during certain time periods. For example, a BS 105 may seek opportunities to enter a sleep mode so that at least some of the RF components and/or BB components used for OTA communications can be powered down. The powering down of at least some OTA components can save power, and thus can reduce network operational cost. Mechanisms for performing network sleep mode operations are described in greater detail herein.

Figure 2:
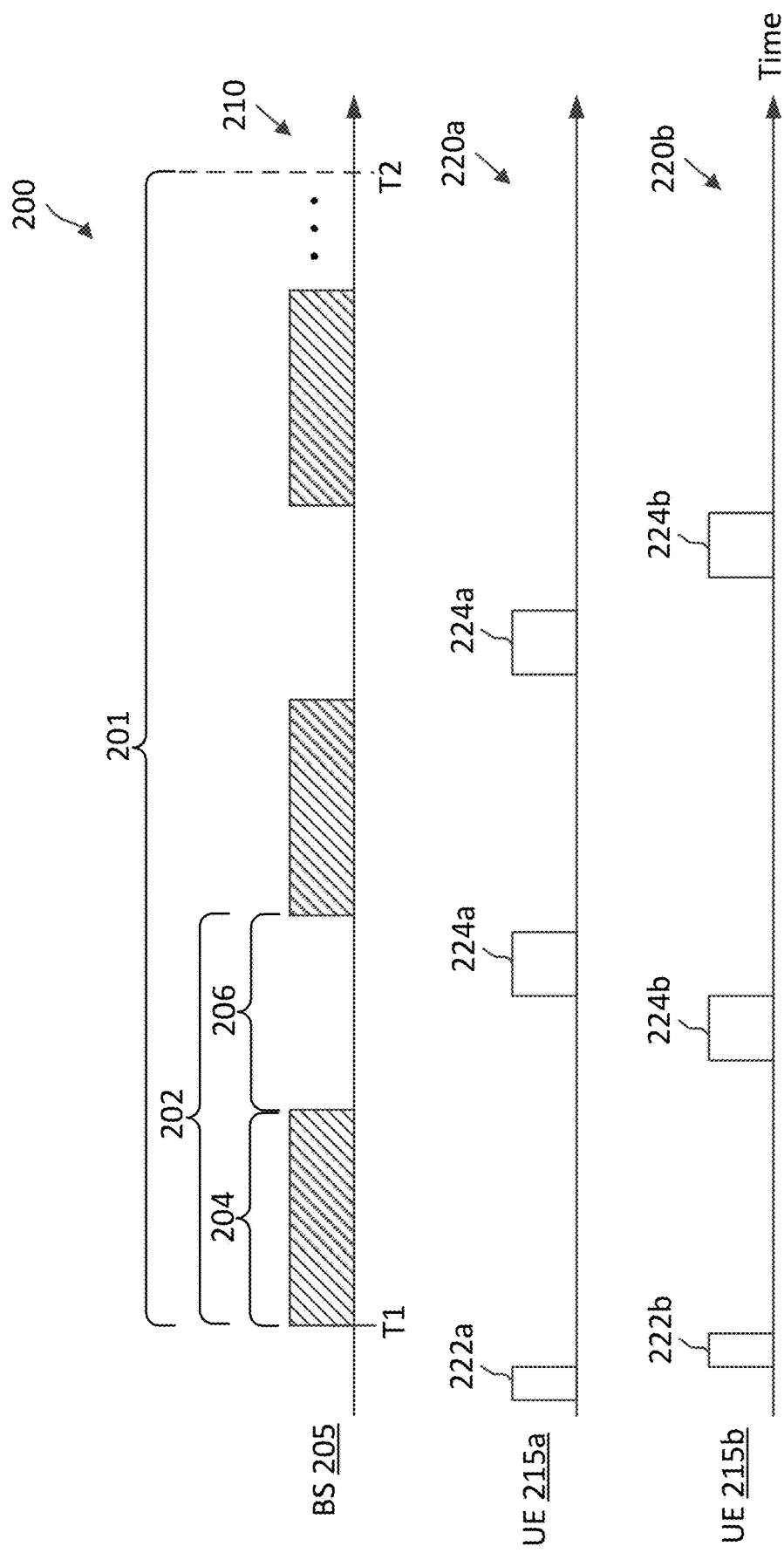
FIG. 2 is a timing diagram illustrating a network power saving method according to some embodiments of the present disclosure.

FIG. 2 is a timing diagram illustrating a network power saving method 200 according to some embodiments of the present disclosure. The method 200 is employed by BSs such as the BSs 105 and UEs such as the UEs 115 in a network such as the network 100. In FIG. 2, the x-axes represent time in some constant units. In the method 200, a BS 205 may serve UL and/or DL communications to a plurality of connected UEs 215. The BS 205 may be similar to the BSs 105 and the UEs 215 may be similar to the UEs 115. For purposes of simplicity of illustration and discussion, FIG. 2 illustrates the BS 205 having two connected UEs 215a and 215b. However, embodiments of the present disclosure can be scaled to include any suitable number of UEs (e.g., about 3, 4, 5, 10, 20, or more) connected to the BS 205.

The timeline 210 illustrates a sleep mode timeline of the BS 205. The timeline 220a illustrates a UL transmission timeline of the UE 215a. The timeline 220b illustrates a UL transmission timeline of the UE 215b. At time T1, the BS 205 determines to enter a sleep mode to save power. The sleep mode may continue for a sleep mode period 201 and ends at time T2. The sleep mode period 201 may include a plurality of sleep-wake cycles 202. Each cycle 202 includes a sleep window 204 and an awake window 206.

The BS 205 may determine to enter the sleep mode based on various factors, such as network traffic needs, power consumption parameters, and/or power supply parameters. To determine the duration of the sleep windows 204, the BS 205 may request the connected UEs 215a and 215b to report UL buffer statuses at the corresponding UEs 215a and 215b, respectively, prior to entering the sleep mode. Each of the UEs 215a and 215b may transmit a scheduling request (SR) 222a and an SR 222b, respectively, to provide the BS 205 with a UL buffer status report (e.g., indicating a number of UL data bytes queued at the corresponding buffers).

The BS 205 may determine the sleep pattern and when to enter the sleep mode based on the received SRs 222a and 222b. The BS 205 may enter the sleep mode when there is no UL data, delay-sensitive UL and/or DL data, or data with known or preconfigured periodicity (e.g., background synchronization signals). Depending on the receive SRs 222a and 222b, the BS 205 may define a periodic sleep pattern as shown in the time line 210 or an on-demand-based sleep mode (e.g., a single sleep window).

The BS 205 may receive UL data, UL controls, and/or DL measurements from the UEs 215 outside of the sleep windows 204, but not within the sleep windows 204. As shown, the UE 215a may transmit UL communication signals 224a (e.g., including UL data, UL control, and/or DL measurements) to the BS 205 during the awake windows 206. Similarly, the UE 215b may transmit UL communication signals 224b (e.g., including UL data, UL control, and/or DL measurements) to the BS 205 during the awake windows 206.

During the sleep windows 204, the BS 205 may power down some of the BS 205's components, such as RF, BB, and/or upper-layer processing components, or at least a subset of the components. The BS 205 may refrain from transmitting any DL information data or dedicated control information to the UEs 215. However, in some instances, the BS 205 may transmit broadcast control information (e.g., PSS, SSS, PBCH signals) periodically so that the connected UEs 215 may maintain synchronization with the BS 205 and new UEs seeking to join the network may detect the presence of the BS 205.

In an embodiment, to enable new UEs to join the network, the BS 205 may further reserve certain resources (e.g., RACH resources) and/or configure certain signal monitoring or detection circuitry to remain in an active mode during the sleep windows 204 so that the BS 205 may detect random access preambles from UEs requesting to access the network.

In an embodiment, the BS 205 has knowledge of DL data statuses of the UEs 215 and associated control information, such as acknowledgements/not-acknowledgements (ACKs/NACKs). Thus, the BS 205 may configure the sleep mode pattern such that the UEs 215 may transmit the ACKs/NACKs without interruption.

In an embodiment, the BS 205 may support multiple sleep mode levels, for example, a deep sleep mode and a light sleep mode. The BS 205 may power-down different sets of components for a deep sleep and a light sleep. Alternatively or additionally, the BS 205 may configure a component to be in a different power state depending on whether the BS 205 is entering a deep sleep mode or a light sleep mode. The network or the BS 205 may be able to enter a deep sleep mode or a light sleep mode depending on the duration available for sleeping. For example, when the sleep duration (e.g., the sleep windows 204) is long (e.g., about 100 ms), the network or the BS 205 may enter a deep sleep mode. Otherwise, the BS 205 may enter a light sleep mode.

In some instances, the BS 205 may provide UEs with information associated with the sleep mode using broadcast signaling. In some other instances, the BS 205 may notify specific connected UEs of the sleep mode using media access control (MAC) control elements (CEs) or physical layer one (L1) signaling. In some instances, the BS 205 may configure the connected UEs with sleep mode information, such as the lengths or durations of the sleep windows 204, the periodicity of the cycles 202, and/or the timing offset between sleep windows 204 via RRC signaling. Mechanisms for performing network sleep mode operations are described in greater detail herein.

Figure 3:
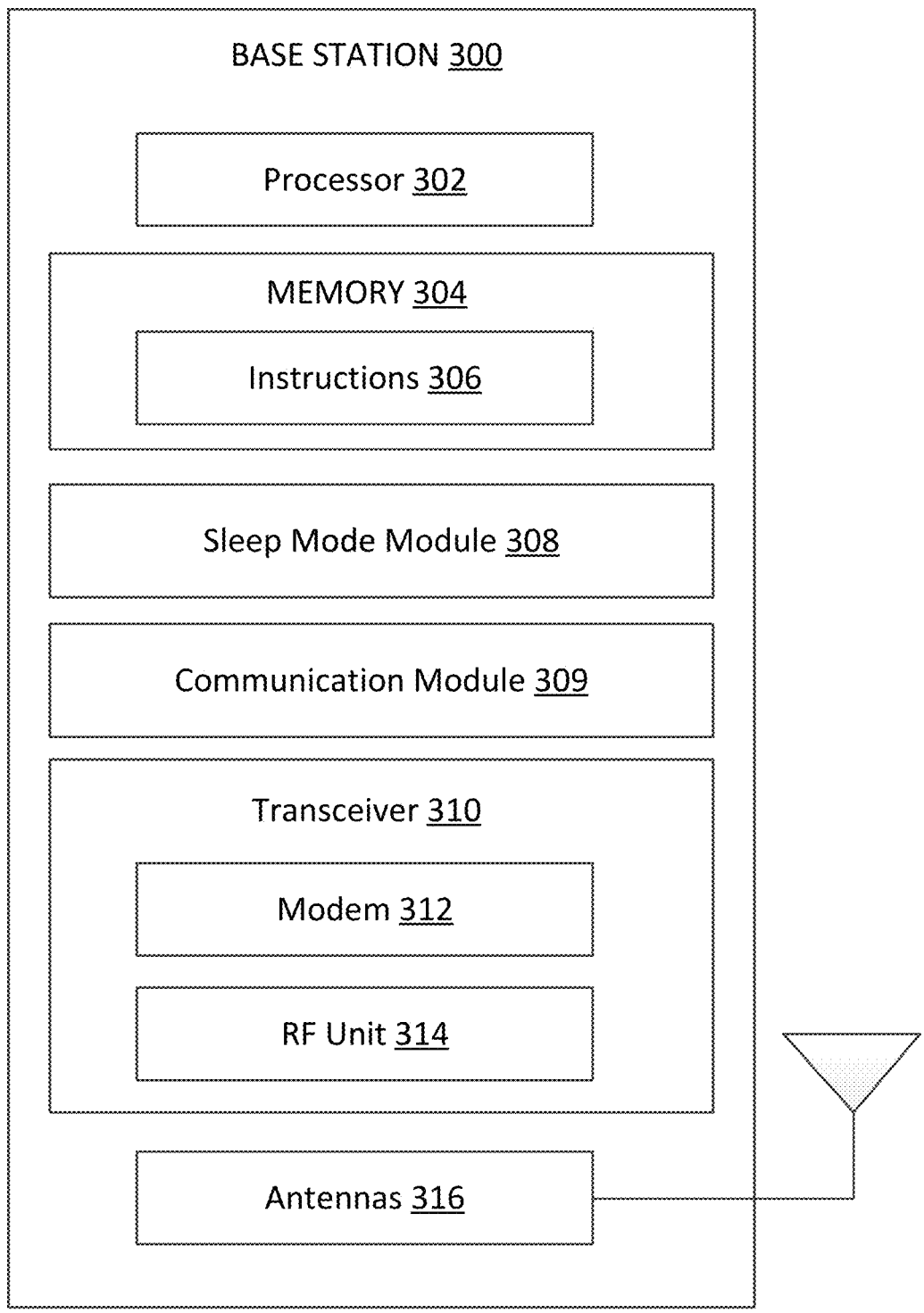
FIG. 3 is a block diagram of a user equipment (UE) according to some embodiments of the present disclosure.

FIG. 3 is a block diagram of an exemplary BS 300 according to embodiments of the present disclosure. The BS 300 may be a BS 105 in the network 100 and the BS 205 as discussed above in FIG. 1. As shown, the BS 300 may include a processor 302, a memory 304, a sleep mode module 308, a communication module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 and 215 in connection with embodiments of the present disclosure, for example, aspects of FIGS. 5-8. Instructions 306 may also be referred to as code. The terms "instructions" and "code"

should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the sleep mode module 308 and the communication module 309 may be implemented via hardware, software, or combinations thereof. For example, each of the sleep mode module 308 and the communication module 309 may be implemented as a processor, circuit, and/or instructions 306 stored in the memory 304 and executed by the processor 302. In some examples, a BS may include one of the sleep mode module 308 or the communication module 309. In other examples, a BS may include both the sleep mode module 308 and the communication module 309. In some examples, the BS may implement the sleep mode module 308 and the communication module 309 as an integrated module.

The sleep mode module 308 and the communication module 309 may be used for various aspects of the present disclosure, for example, aspects of FIGS. 5-8. The sleep mode module 308 is configured to determine to enter a sleep mode, determine a sleep window duration (e.g., the sleep windows 204) and/or an awake or active duration (e.g., the awake windows 206) for the sleep mode based on UL and/or DL traffic needs in the network, configure timers to track the sleep and awake cycle (e.g., the cycles 202), instruct the communication module 309 to request UL buffer status reports (e.g., the SRs 222) from connected UEs (e.g., the UEs 115 and 215) prior to entering a sleep mode, configure at least some components of the BS 300 (e.g., at least a subset of components in the RF unit 314 and/or the modem subsystem 312) to be in a power-down mode or a low-power mode during a sleep window, configure the powered down or low-power mode components to return to the power-up or awake state when transitioning from a sleep window to an awake window, instruct the communication module 309 to transmit UL scheduling grants to the connected UEs, determine to stop a sleep mode at the BS 300, and/or instruct the communication module 309 to notify the connected UEs of the end of the sleep mode.

The communication module 309 is configured to request for a UL buffer status from the connected UEs prior to the BS entering a sleep mode, receive scheduling requests (SRs) (e.g., the SRs 222) from the UEs indicating corresponding UL buffer statuses (e.g., number of UL data bytes queued up at corresponding UEs), transmit UL scheduling grants to the UEs based on corresponding UL buffer statuses, receive UL data (e.g., the UL communication signals 224) from corresponding UEs, notify the sleep mode module 308 that the BS is ready to enter a sleep mode, notify the connected UEs of the start of the sleep mode, refrain from UL and DL communications during a sleep window, transmit UL scheduling grants to the connected UEs after transitioning from a sleep window to an awake window, communicate UL and/or DL communications with the connected UEs during an awake window, and/or notify the connected UEs of the end of the sleep mode. In an embodiment, the communication module 309 can include information associated with the sleep/awake cycle in a sleep mode start notification message to a connected UE.

In an embodiment, the sleep mode module 308 can configure the OTA components (e.g., in the RF unit 314 and/or the modem subsystem 312) such that the BS 300 can transmit DL control and/or synchronization signals (e.g., PSS, SSS, PBCH signals) during a sleep window to enable the connected UEs to maintain synchronization with the network and/or new UE seeking to join the network to detect the BS 300 and perform signal measurements.

In an embodiment, the sleep mode module can configure the OTA components (e.g., in the RF unit 314 and/or the modem subsystem 312) such that the BS 300 can monitor for random access channel (RACH) signals (e.g., RACH preambles) from UEs seeking to join the network during a sleep window. The communication module 309 is configured to transmit DL synchronization signals and/or monitor for RACH signals during a sleep window as instructed by the sleep mode module 308.

In an embodiment, the sleep mode module 308 is configured to detect power critical time periods (e.g., when the network has a low power supply), instruct the communication module 309 to broadcast a sleep mode start notification to the connected UEs, and enter a sleep mode by powering down at least the OTA components. The communication module 309 is configured to transmit a sleep mode start notification message in a broadcast mode to the connected UEs as instructed by the sleep mode module 308.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, the sleep mode module 308 and the communication module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 300 to enable the BS 300 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of SR trigger messages, UL and/or DL scheduling grants, sleep mode start indication messages, DL broadcast system information and/or synchronization signals, DL data and/or control communications, random access related messages, and/or sleep mode end indication messages according to embodiments of the present disclosure. The antennas 316 may further receive data messages transmitted from other devices. This may include, for example, reception of SRs, UL buffer status reports, UL data, and/or RACH preambles according to embodiments of the present disclosure. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

In an embodiment, the BS 300 can include multiple transceivers 310 implementing different RATs (e.g., NR and LTE). In an embodiment, the BS 300 can include a single transceiver 310 implementing multiple RATs (e.g., NR and LTE). In an embodiment, the transceiver 310 can include various components, where different combinations of components can implement RATs.

Figure 4:
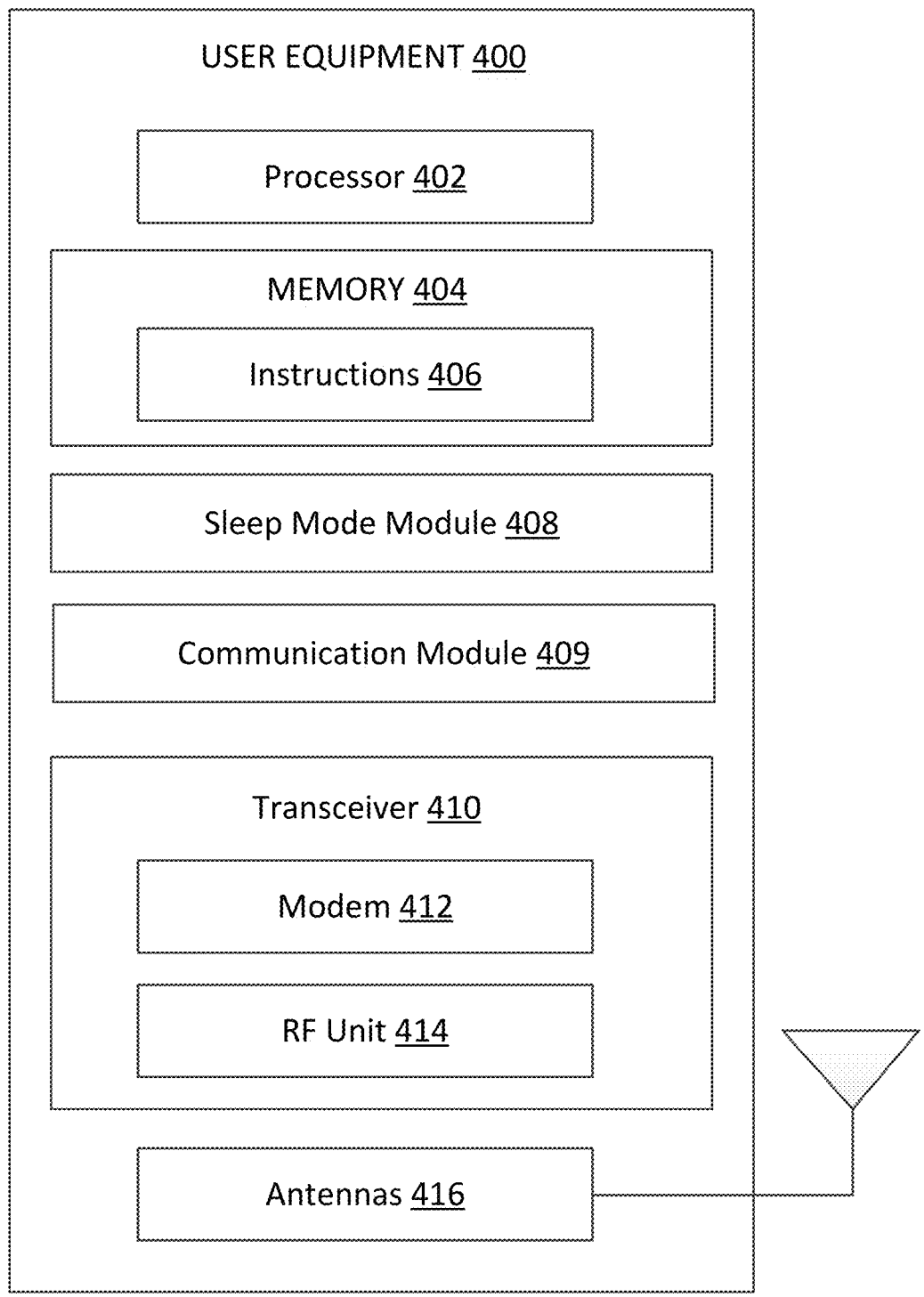
FIG. 4 is a block diagram of an exemplary base station (BS) according to some embodiments of the present disclosure.

FIG. 4 is a block diagram of an exemplary UE 400 according to embodiments of the present disclosure. The UE 400 may be a UE 115 in the network 100 as discussed above in FIG. 1. A shown, the UE 400 may include a processor 402, a memory 404, a sleep mode module 408, a communication module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 5-8. Instructions 406 may also be referred to as code, which may be interpreted broadly to include any type of computer-readable statement(s) as discussed above with respect to FIG. 3.

Each of the sleep mode module 408 and the communication module 409 may be implemented via hardware, software, or combinations thereof. For example, each of the sleep mode module 408 and the communication module 409 may be implemented as a processor, circuit, and/or instructions 406 stored in the memory 404 and executed by the processor 402. In some examples, a BS may include one of the sleep mode module 408 or the communication module 409. In other examples, a BS may include both the sleep mode module 408 and the communication module 409. In some examples, the BS may implement the sleep mode module 408 and the communication module 409 as an integrated module.

The sleep mode module 408 and the communication module 409 may be used for various aspects of the present disclosure, for example, aspects of FIGS. 5-8. The sleep mode module 408 is configured to configure components of UE 400 (e.g., components in the RF unit 314 and the modem subsystem 412) to be in a power-down mode, a low-power mode, or an inactive mode during a sleep period (e.g., sleep windows 204) of a serving BS (e.g., the BSs 105, 205, and 300), and/or configure times to track sleep pattern or sleep periods of the serving BS.

The communication module 409 is configured to receive an SR trigger from a serving BS prior to a sleep mode period (e.g., the sleep mode period 201) of the BS, transmit SRs (e.g., the SRs 222) in response to the SR trigger, receive UL scheduling grants from the BS, transmit UL data (e.g., the UL communication signals 224) based on the received UL scheduling grants, receive a sleep mode start trigger from the BS, receive a sleep mode configuration (e.g., including sleep lengths, periodicity, and/or offsets) from the BS, coordinate with the sleep mode module 408 to power down certain components of the UE 400 and/or set up timers to track the sleep pattern of the BS, refrain from transmitting UL communication signals to the BS during sleep periods of the BS, monitor for scheduling grants from the BS during awake periods (e.g., the awake windows 206), communicate DL/UL communications (e.g., data and/or controls) with the BS based on the DL/UL scheduling grants, and/or receive a sleep mode end trigger from the BS.

In an embodiment, the communication module 409 is configured to maintain synchronization with the serving BS during sleep periods of the BS. In an embodiment, the communication module 409 is configured to transmit a RACH preamble to a BS while the BS is in a sleep period.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc.

The RF unit 414 may be configured to process (e.g., perform analog to digital conversion or digital to analog conversion, etc.) modulated/encoded data from the modem subsystem 412 (on outbound transmissions) or of transmissions originating from another source such as a BS 105, 205, and 300 or a UE such as a UE 115 and 215. The RF unit 414 may be further configured to perform analog beamforming in conjunction with the digital beamforming. Although shown as integrated together in transceiver 410, the modem subsystem 412 and/or the RF unit 414 may be separate devices that are coupled together at the UE 400 to enable the UE 400 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of SRs (e.g., the SRs 222), UL communications (e.g., the UL communication signals 224), and/or RACH preambles according to embodiments of the present disclosure. The antennas 416 may further receive data messages transmitted from other devices and provide the received data messages for processing and/or demodulation at the transceiver 410. This may include, for example, reception of SR triggers, sleep mode start indications, sleep mode stop indications, DL synchronization signals, and/or UL scheduling grants according to embodiments of the present disclosure. The antennas 416 may include multiple antennas of similar or different designs in order to sustain multiple transmission links.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement RATs.

Figure 5:
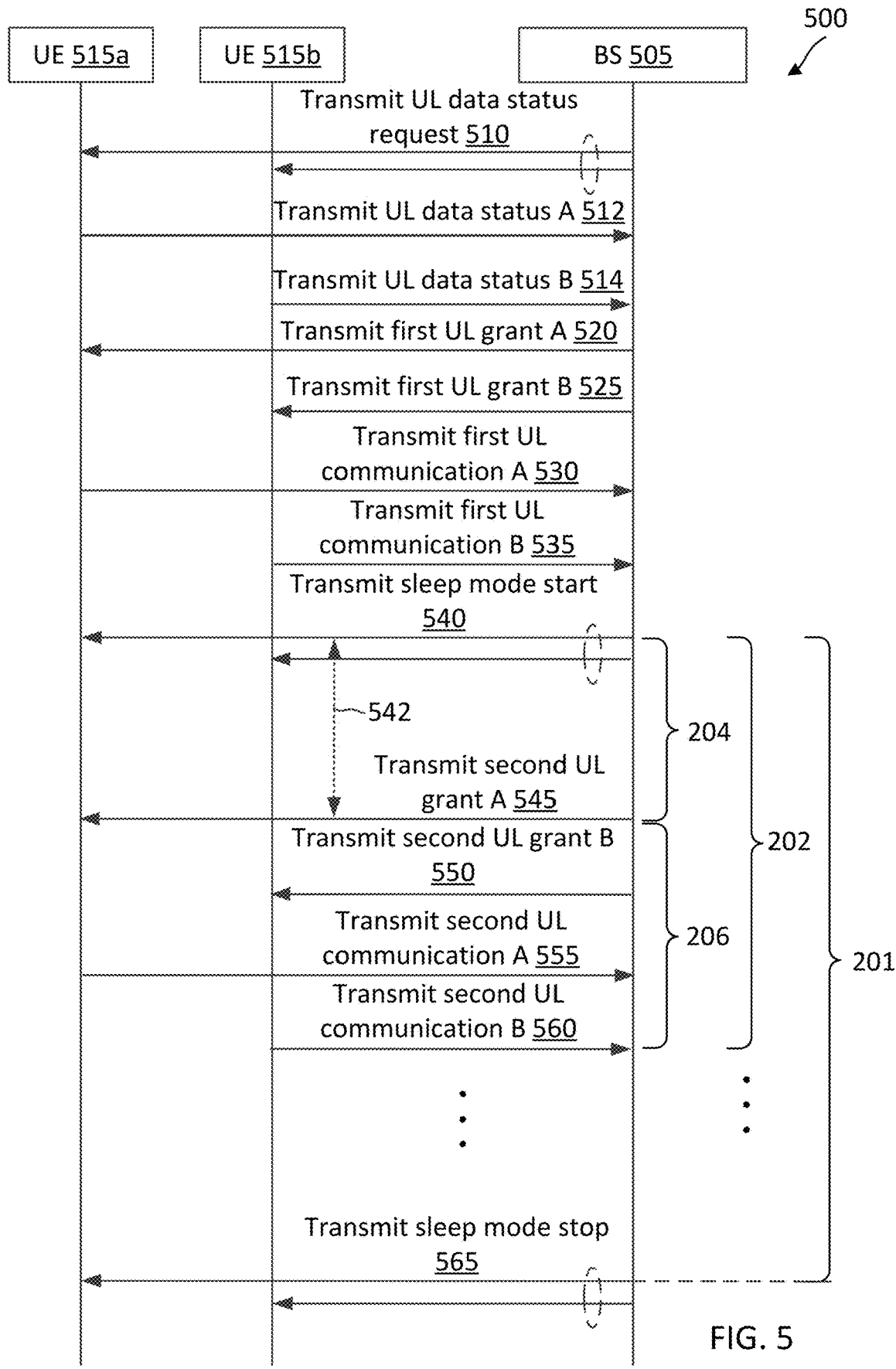
FIG. 5 is a signaling diagram illustrating a network power saving method according to some embodiments of the present disclosure.

FIG. 5 illustrates a signaling diagram of a network power saving method 500 according to embodiments of the present disclosure. The method 500 is implemented between a BS 505, a UE 515a and a UE 515b connected to the BS 505. The BS 505 is similar to the BSs 105, 205, and 300. The UEs 515a and 515b are similar to the UEs 115, 215, and 400. Steps of the method 500 can be executed by computing devices (e.g., a processor, processing circuit, and/or other suitable component) of the BS 505 and the UEs 515a and 515b. The method 500 may employ similar mechanisms as in the method 200 described with respect to FIG. 2. Additionally, the method 500 is described in relation to the sleep/wake cycle of FIG. 2, and may use the same reference numerals for simplicity sake. As illustrated, the method 500 includes a number of enumerated steps, but embodiments of the method 500 may include additional steps before, after, and in between the enumerated steps. In some embodiments, one or more of the enumerated steps may be omitted or performed in a different order.

At step 510, the BS 505 transmits a UL data status request to the UEs 515a and 515b. The BS 505 may transmit the UL data status request via a L1 message over a PDCCH channel or via a MAC CE over a PUSCH channel. The BS 505 may transmit separate UL data status requests for the UEs 515a and 515b or a single UL data status request for the UEs 515a and 515b. The BS 505 may determine to enter a sleep mode, and thus may want to allow the UE 515a and the UE 515b to transmit UL data that are queued up at the UE 515a and the UE 515b before entering a sleep mode.

At step 512, the UE 515a transmits a UL data status A to the BS 505 (e.g., via a PUCCH) in response to the UL data status request. The UL data status A may include a UL buffer status of the UE 515a, for example, a number of UL data bytes queued at the UE 515a ready for transmission. In an embodiment, the UL data status A may be in the form of a scheduling request (SR) message similar to the SR 222a and the UL data status request may be an SR trigger message.

Similarly, at step 514, the UE 515b transmits a UL data status B (e.g., the SR 222b) to the BS 505 (e.g., via a PUCCH) in response to the UL data status request. The UL data status B may include a UL buffer status of the UE 515b, for example, a number of UL data bytes queued at the UE 515b ready for transmission At step 520, the BS 505 transmits a first UL grant A (e.g., indicating scheduling information and resources) to the UE 515a (e.g., via a PDCCH) prior to entering a sleep mode.

At step 525, the BS 505 transmits a first UL grant B (e.g., indicating scheduling information and resources) to the UE 515b (e.g., via a PDCCH) prior to entering a sleep mode.

At step 530, the UE 515a transmits first UL communication A (e.g., the UL communication signals 224a) to the BS 505 (e.g., via a PUCCH and/or a PUSCH) based on the first UL grant A.

At step 535, the UE 515b transmits first UL communication B (e.g., the UL communication signals 224b) to the BS 505 (e.g., via a PUCCH and/or a PUSCH) based on the first UL grant B.

At step 540, after receiving the first UL communication A and the first UL communication B, the BS 505 transmits a sleep mode start message to notify the UEs 515a and 515b that the BS 505 will enter a sleep mode. The BS 505 may transmit the sleep mode start message via a L1 signal or a MAC CE signal (e.g., at a time corresponding to time T1 in the method 200). The BS 505 may include in the sleep mode start message timing information associated with the sleep mode. The information can include a sleep window duration (e.g., the sleep windows 204), an awake window duration (e.g., the awake windows 206), and/or a sleep window periodicity (e.g., the cycles 202). In some embodiments, the BS 505 may configure the UE with the sleep mode configuration via an RRC message.

In an embodiment, the BS 505 may configure a sleep timer 542 based on a duration of the sleep window 204. Similarly, each of the UEs 515a and 515b may configure a timer based on the duration of the sleep window 204 provided by the BS 505.

At step 545, after the sleep timer 542 expires, the BS 505 transmits a second UL grant A (e.g., indicating scheduling information and resources) to the UE 515a (e.g., via a PDCCH) during the awake window 206. Similarly, at step 550, the BS 505 transmits a second UL grant B (e.g., indicating scheduling information and resources) to the UE 515b (e.g., via a PDCCH) after the sleep timer expires and transition into the awake window 206.

At step 555, the UE 515a transmits second UL communication A (e.g., the UL communication signals 224a) to the BS 505 (e.g., via a PUCCH and/or a PUSCH) based on the second UL grant A.

At step 560, the UE 515b transmits second UL communication B (e.g., the UL communication signals 224b) to the BS 505 (e.g., via a PUCCH and/or a PUSCH) based on the second UL grant B.

The sleep/awake cycle 202 may repeat during the sleep mode period 201. At the end of the sleep mode, for example, the BS 505 determines to exit the sleep mode or the power saving mode. At step 565, the BS 505 transmits a sleep mode stop message to notify the UEs 515a and 515b of the end of the sleep mode (e.g., at a time corresponding to time T2 in the method 200).

In an embodiment, when the BS 505 has DL data for the UE 515a or the UE 515b, the BS 505 may transmit the DL data to the corresponding UE 515 during the awake window 206 or prior to entering the sleep mode (e.g., before the start of the sleep mode period 201).

As can be observed, the BS 505 seeks opportunities to enter a sleep mode and allows the connected UEs 515 to empty their corresponding UL buffers prior to entering the sleep mode. Accordingly, the disclosed embodiments allow for network sleep periods with minimal or no interruptions to the connected UEs 515' operations.

Figure 6:
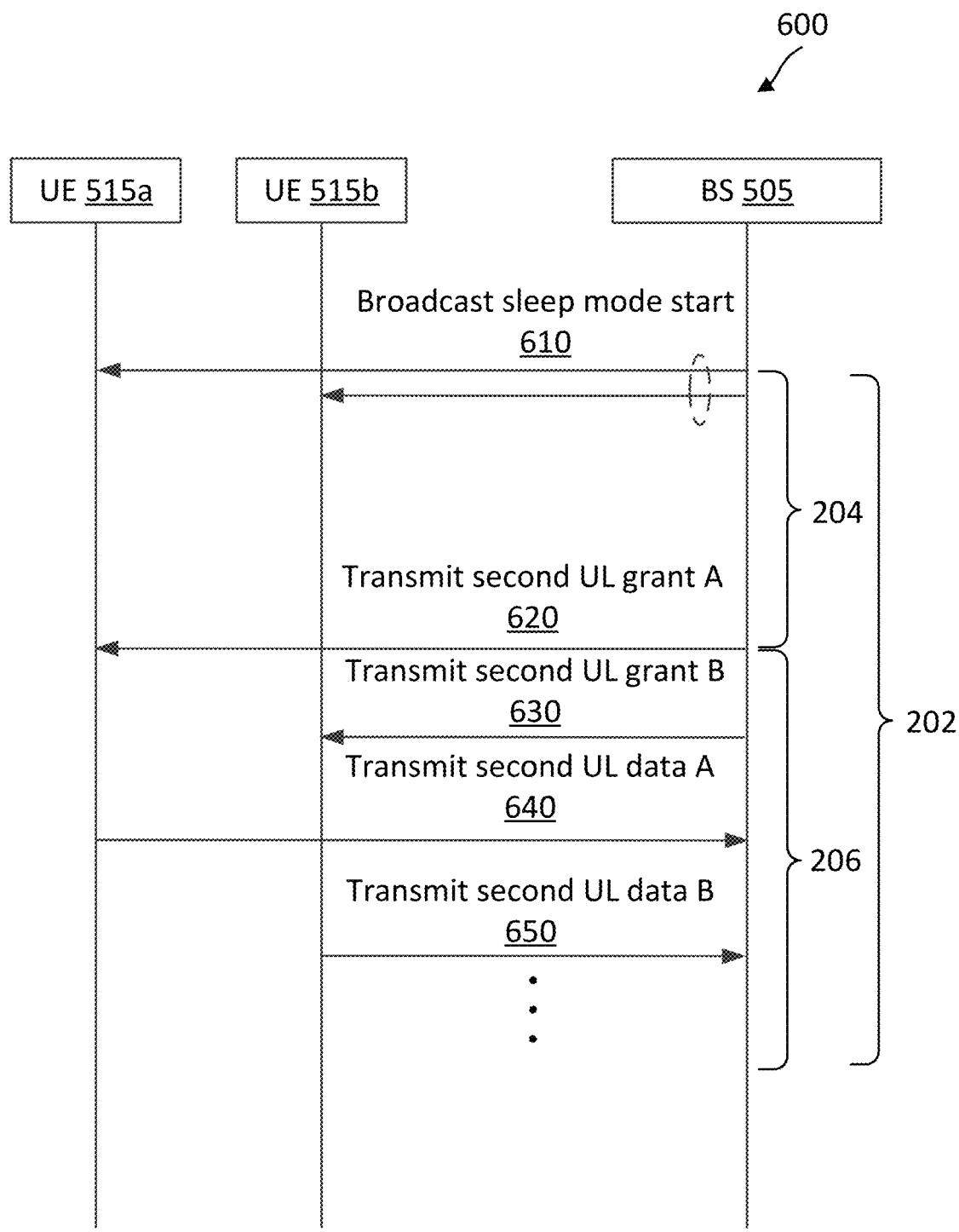
FIG. 6 is a signaling diagram illustrating a network power saving method according to some embodiments of the present disclosure.

FIG. 6 illustrates a signaling diagram of a network power saving method 600 according to embodiments of the present disclosure. The method 600 is implemented between a BS 605, a UE 615a and a UE 615b connected to the BS 605. The BS 605 is similar to the BSs 105, 205, 300, and 505. The UEs 615a and 615b are similar to the UEs 115, 215, 400, and 615. Steps of the method 600 can be executed by computing devices (e.g., a processor, processing circuit, and/or other suitable component) of the BS 605 and the UEs 615ba and 615b. The method 600 may employ similar mechanisms as in the methods 200 described with respect to FIG. 2. Additionally, the method 600 is described in relation to the sleep/wake cycle of FIG. 2, and may use the same reference numerals for simplicity sake. As illustrated, the method 600 includes a number of enumerated steps, but embodiments of the method 600 may include additional steps before, after, and in between the enumerated steps. In some embodiments, one or more of the enumerated steps may be omitted or performed in a different order.

The method 600 is substantially similar to the method 500, but illustrates a scenario when a network needs to enter a sleep mode to save power quickly. Thus, the BS 605 may not have time to trigger the UEs 615a and 615b to send UL data status report and to allow the UEs 615a and 615b to transmit UL data queued up at the corresponding UEs 615a and 615b before entering a sleep mode.

At step 610, the BS 605 transmits a broadcast sleep mode start message to notify the UEs 615a and 615b that the BS 605 will enter a sleep mode. The BS 605 may transmit the sleep mode start message via a L1 signal, a MAC CE, or an RRC message. The BS 605 may include in the sleep mode start message timing information associated with the sleep mode. The information can include a sleep window duration (e.g., the sleep windows 204), an awake window duration (e.g., the awake windows 206), and/or a sleep window periodicity (e.g., the cycles 202). Upon receiving the sleep mode start message, the UEs 615a and 615b may stop UL data and/or UL control transmission to the BS 605.

In an embodiment, the BS 605 may configure a timer 542 based on a duration of the sleep window 204. Similarly, each of the UEs 615a and 615b may configure a timer based on the duration of the sleep window 204 provided by the BS 605.

At step 620, after the sleep timer expires, the BS 605 transmits a UL grant A (e.g., indicating scheduling information and resources) to the UE 615a (e.g., via a PDCCH) during the awake window 206. Similarly, at step 630, the BS 605 transmits a UL grant B (e.g., indicating scheduling information and resources) to the UE 615b (e.g., via a PDCCH) after the sleep timer expires and transition into the awake window 206.

At step 630, the UE 615a transmits UL communication A (e.g., the UL communication signals 224a) to the BS 605 (e.g., via a PUCCH and/or a PUSCH) based on the UL grant A.

At step 640, the UE 615b transmits second UL communication B (e.g., the UL communication signals 224b) to the BS 605 (e.g., via a PUCCH and/or a PUSCH) based on the UL grant B.

The sleep/awake cycle 202 may repeat during the sleep mode period 201. At the end of the sleep mode, for example, the BS 505 determines to exit the sleep mode or the power saving mode. At step 650, the BS 505 transmits a sleep mode stop message to notify the UEs 615a and 615b of the end of the sleep mode.

In an embodiment, instead of including the sleep window 204 and/or cycle 202 information in the broadcast sleep mode start message at step 610, the BS 605 can transmit a wakeup message at the end of the sleep window 204 to notify the UEs 615a and 615b that the BS 605 transitions from the sleep window 204 to the awake window 206.

As can be observed, upon detecting a critical low power critical condition, the BS 605 can broadcast a sleep mode start indication to all UEs in the coverage area of the BS 605 and quickly enter a sleep mode. Upon a power recovery, the BS 605 can return to serve the UEs using previously established connections. Accordingly, the disclosed embodiments allow a network to enter a sleep mode upon a critical condition and notify the UEs in the area without causing the UEs to be disconnected from the network.

While not show, in some embodiments, the BS 505 in the method 500 and/or the BS 605 in the method 600 may transmit DL system information signals (e.g., SSBs) and/or other DL control signals during the sleep window 204 to allow connected UEs to maintain synchronization with the corresponding BS and to allow new UEs to perform random access with the corresponding BS. In some embodiments, the BS 505 and/or the BS 605 may provide certain sleep mode information in the DL system information signals and/or DL control signals to further facilitate random access procedures during a sleep mode. For example, a UE seeking to join the network may know when to access the network, for example, when to initiate a random access procedure with the network based on the sleep mode information (e.g., during an awake window 206).

Figure 7:
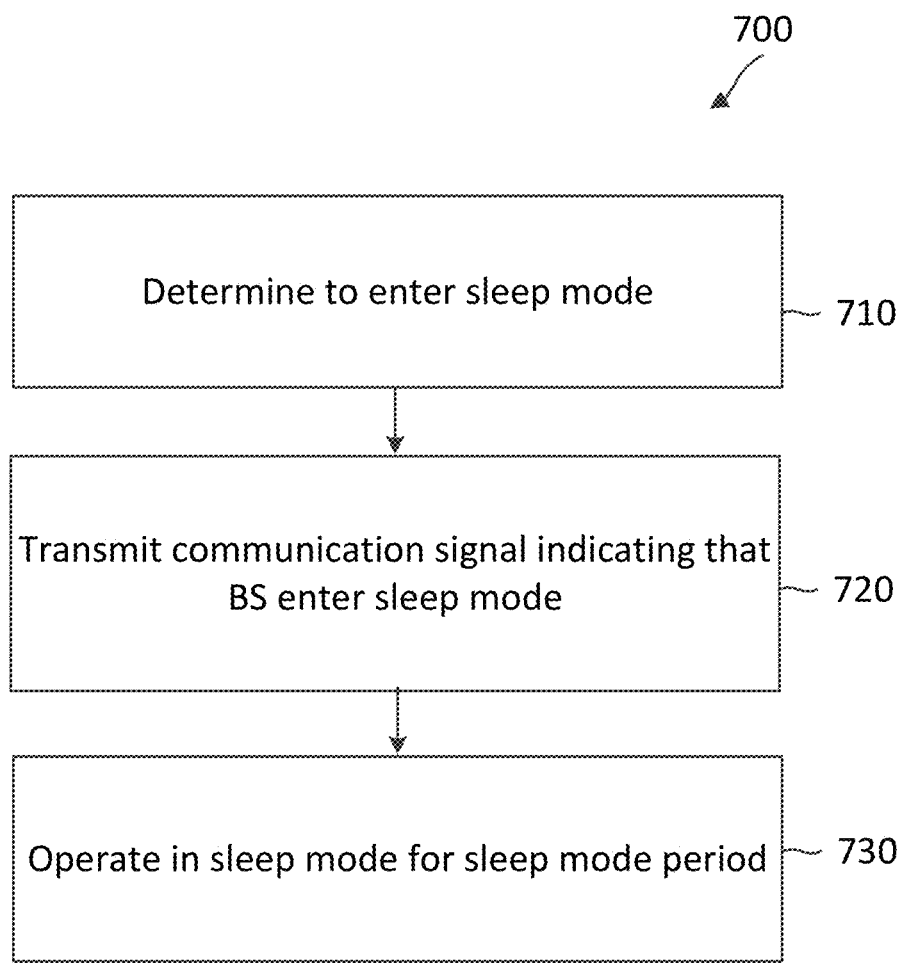
FIG. 7 is a flow diagram of a network power saving method according to some embodiments of the present disclosure.

FIG. 7 is a flow diagram of a network power saving method 700 according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the BSs 105, 205, 300, 505, and 605, may utilize one or more components, such as the processor 302, the memory 304, the sleep mode module 308, the communication module 309, the transceiver 310, the modem 312, and the one or more antennas 316, to execute the steps of method 700. The method 700 may employ similar mechanisms as in the methods 200, 500, and 600 as described with respect to FIGS. 2, 5, and 6, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes determining, by a BS of a wireless communication network (e.g., the network 100), to enter a sleep mode.

At step 720, the method 700 includes transmitting, by the BS to one or more UEs (e.g., the UEs 115, 215, 400, 515, and 615) of the wireless communication network, a communication signal indicating that the BS will enter the sleep mode.

At step 730, the method 700 includes operating, by the BS, in the sleep mode for a sleep mode period (e.g., the sleep mode period 201).

In an embodiment, the sleep mode operations include turning off power to one or more components of the BS. The turning off power to one or more components of the BS includes turning off power to at least one of an RF processing component (e.g., the RF unit 314), a baseband processing component (e.g., the modem subsystem 312), or an upper layer processing component (e.g., the processor 302).

In an embodiment, the sleep mode operations include transmitting, by the BS, a DL system information signal. In an embodiment, the DL system information indicates a RACH resource and the sleep mode operations include receiving, by the BS from a second UE different from the one or more UEs, a RACH preamble signal in the RACH resource.

In an embodiment, the sleep mode operations include periodically switching between a sleep window (e.g., the sleep windows 204) of the sleep mode period and an active window (e.g., the awake windows 206) of the sleep mode period.

In an embodiment, the sleep mode operations include refraining, by the BS during the sleep window of the sleep mode period, from performing uplink and downlink communications and performing, by the BS during the active window of the sleep mode period, at least one of an uplink communication or a downlink communication.

In an embodiment, the BS may transmit the communication signal in a broadcast mode to the one or more UEs. In an embodiment, the BS may transmit the communication signal via L1 message or a MAC CE. In an embodiment, the BS may transmit, to the one or more UEs, sleep mode configuration information via an RRC message.

In an embodiment, the BS may transmit the communication signal by transmitting a start signal indicating a start of the sleep mode period. In an embodiment, the communication signal includes an indication a length of the sleep mode period.

In an embodiment, the BS further transmits, to the one or more UEs, a stop signal indicating an end of the sleep mode period.

In an embodiment, the determining to enter the sleep mode includes receiving, by the BS from the one or more UEs, a UL data status (e.g., the SRs 222) and determining, by the BS, a start of the sleep mode period based on the received UL data status. In an embodiment, the BS further transmits, to the one or more UEs, a request for the one or more UEs to transmit the UL data status to the BS.

Figure 8:
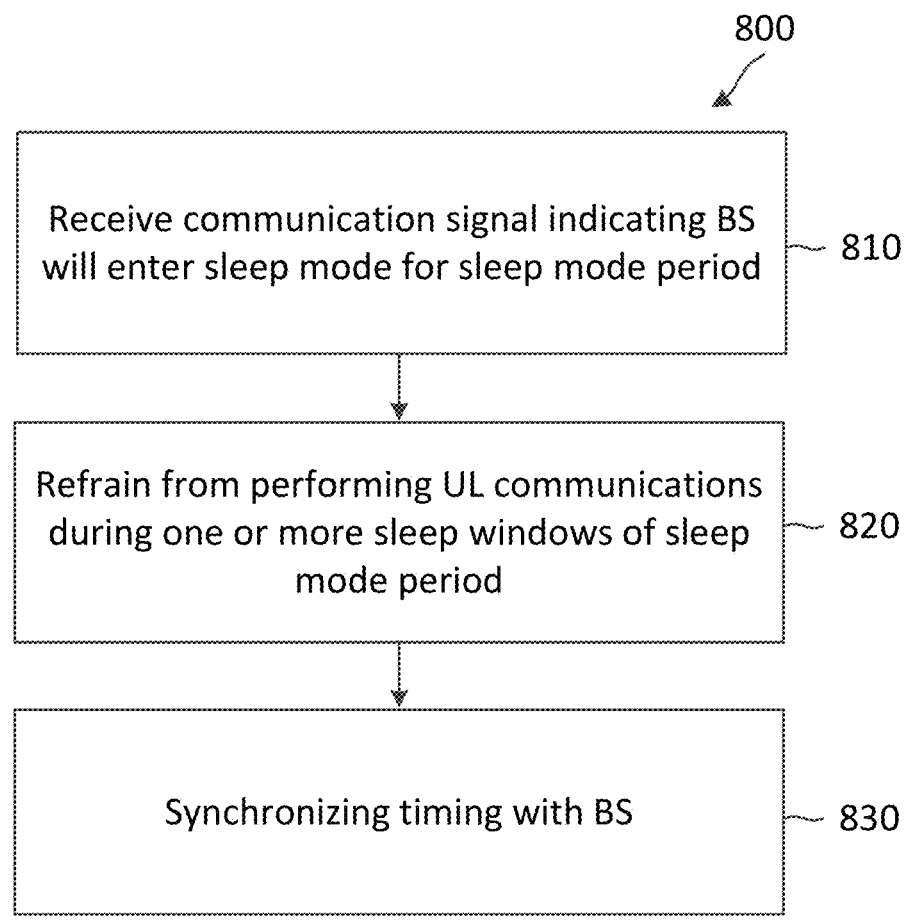
FIG. 8 is a flow diagram of a network power saving method according to some embodiments of the present disclosure.

FIG. 8 is a flow diagram of a network power saving method 800 according to some embodiments of the present disclosure. Steps of the method 800 can be executed by a computing device (e.g., a processor, processing circuit, and/or other suitable component) of a wireless communication device or other suitable means for performing the steps. For example, a wireless communication device, such as the UEs 115, 215, 400, 515, and 615, may utilize one or more components, such as the processor 402, the memory 404, the sleep mode module 408, the communication module 409, the transceiver 410, the modem 412, and the one or more antennas 416, to execute the steps of method 800. The method 800 may employ similar mechanisms as in the methods 200, 500, and 600 as described with respect to FIGS. 2, 5, and 6, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes receiving, by a UE from a BS (e.g., the BS 105, 205, 300, 505, or 605), a communication signal indicating that the BS will enter a sleep mode for a sleep mode period (e.g., the sleep mode period 201).

At step 820, the method 800 includes refraining, by the UE during one or more sleep windows (e.g., the sleep windows 204) of the sleep mode period, from performing uplink communications.

In an embodiment, the UE further communicates, with the BS, at least one of an uplink communication signal or a downlink communication signal during one or more active windows (e.g., the active windows 206) of the sleep mode period.

In an embodiment, the communication signal is a broadcast signal from the BS. In an embodiment, the communication signal is received via at least one of a L1 signal or a MAC CE. In an embodiment, the UE further receives, from the BS, sleep mode configuration information via an RRC message.

In an embodiment, the communication signal includes a start signal indicating a start of the sleep mode period. In an embodiment, the communication signal further includes an indication of a length of the sleep mode period. In an embodiment, the communication signal further includes an indication of a length of the one or more sleep windows of the sleep mode period.

In an embodiment, the UE further receives, from the BS, a stop signal indicating an end of the sleep mode period.

In an embodiment, the UE further receives, from the BS, a request to transmit an UL data status to the BS. The UE further transmit, to the BS, the UL data status (e.g., the SRs 222), where a start of the sleep mode period is at least partially based on the UL data status.

In an embodiment, the UE further synchronizes, during at least one of the one or more sleep windows of the sleep mode period, timing with the BS.

In an embodiment, the UE further receives, from the BS, a system information signal including sleep mode information associated with the BS. The UE further performs a random access procedure with the BS based on the sleep mode information. For example, the UE may transmit a random access preamble during an awake window (e.g., the awake window 206) of the BS indicated by the sleep mode information.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including determining, by a base station (BS) of a wireless communication network, to enter a sleep mode; transmitting, by the BS to one or more user equipment (UEs) of the wireless communication network, a communication signal indicating that the BS will enter the sleep mode; and operating, by the BS, in the sleep mode for a sleep mode period.

The method may also include where the operating in the sleep mode includes turning off power to one or more components of the BS. The method may also include where the turning off power to one or more components of the BS includes turning off power to at least one of a radio frequency (RF) processing component, a baseband processing component, or an upper layer processing component. The method may also include where the operating in the sleep mode further includes transmitting, by the BS, a downlink system information signal. The method may also include where the downlink system information signal indicates a random access channel (RACH) resource, and where the operating in the sleep mode further includes receiving, by the BS from a second UE different from the one or more UEs, a RACH preamble signal based on the RACH resource. The method may also include where the operating in the sleep mode includes periodically switching between a sleep window of the sleep mode period and an active window of the sleep mode period. The method may also include where the operating in the sleep mode includes refraining, by the BS during the sleep window of the sleep mode period, from performing uplink and downlink communications; and performing, by the BS during the active window of the sleep mode period, at least one of an uplink communication or a downlink communication. The method may also include where the transmitting the communication signal includes broadcasting the communication signal to the one or more UEs. The method may also include where the transmitting the communication signal includes transmitting the communication signal using at least one of a layer one (L1) signal or a media access control element (MAC CE) signal. The method may also include transmitting, by the BS to the one or more UEs, sleep mode configuration information via a radio resource control (RRC) message. The method may also include where the transmitting the communication signal includes transmitting a start signal indicating a start of the sleep mode period. The method may also include where the transmitting the communication signal further includes transmitting an indication of a length of the sleep mode period. The method may also include transmitting, by the BS to the one or more UEs, a stop signal indicating an end of the sleep mode period. The method may also include where the determining to enter the sleep mode includes receiving, by the BS from the one or more UEs, an uplink (UL) data status; and determining, by the BS, a start of the sleep mode period based on the received UL data status. The method may also include transmitting, by the BS to the one or more UEs, a request for the one or more UEs to transmit the UL data status to the BS.

Further embodiments of the present disclosure include a method of wireless communication, including receiving, by a user equipment (UE) from a base station (BS), a communication signal indicating that the BS will enter a sleep mode for a sleep mode period; refraining, by the UE during one or more sleep windows of the sleep mode period, from performing uplink communications.

The method may also include communicating, by the UE with the BS, at least one of an uplink communication signal or a downlink communication signal during one or more active windows of the sleep mode period. The method may also include where the receiving the communication signal includes receiving a broadcast from the BS. The method may also include where the receiving the communication signal includes receiving the communication signal via at least one of a layer one (L1) signal or a media access control element (MAC CE) signal. The method may also include receiving, by the UE from the BS, sleep mode configuration information via a radio resource control (RRC) message. The method may also include where the receiving the communication signal includes receiving a start signal indicating a start of the sleep mode period. The method may also include where the receiving the communication signal further includes receiving an indication of a length of the sleep mode period. The method may also include where the receiving the communication signal further includes receiving an indication of a length of the one or more sleep windows of the sleep mode period. The method may also include receiving, by the UE from the BS, a stop signal indicating an end of the sleep mode period. The method may also include receiving, by the UE from the BS, a request to transmit an uplink (UL) data status to the BS; and transmitting, by the UE to the BS, the UL data status, where a start of the sleep mode period is at least partially based on the UL data status. The method may also include synchronizing, by the UE during at least one of the one or more sleep windows of the sleep mode period, timing with the BS. The method may also include receiving, by the UE from the BS, a system information signal including sleep mode information associated with the BS; and performing, by the UE with the BS, a random access procedure based on the sleep mode information.

Further embodiments of the present disclosure include a base station (BS) of a wireless communication network, including a processor configured to determine to enter a sleep mode; and operate in the sleep mode for a sleep mode period; and a transceiver configured to transmit, to one or more user equipment (UEs) of the wireless communication network, a communication signal indicating that the BS will enter the sleep mode.

The BS may also include where the processor is further configured to operate in the sleep mode by turning off power to one or more components of the BS. The BS may also include where the processor is further configured to turn off power to one or more components of the BS by turning off power to at least one of a radio frequency (RF) processing component, a baseband processing component, or an upper layer processing component. The BS may also include where the processor is further configured to operate in the sleep mode by transmitting a downlink system information signal. The BS may also include where the downlink system information signal indicates a random access channel (RACH) resource, and where the processor is further configured to operate in the sleep mode by receiving, a second UE different from the one or more UEs, a RACH preamble signal based on the RACH resource. The BS may also include where the processor is further configured to operate in the sleep mode by periodically switching between a sleep window of the sleep mode period and an active window of the sleep mode period. The BS may also include where the processor is further configured to operate in the sleep mode by refraining, during the sleep window of the sleep mode period, from performing uplink and downlink communications; and performing, during the active window of the sleep mode period, at least one of an uplink communication or a downlink communication. The BS may also include where the transceiver is further configured to transmit the communication signal by broadcasting the communication signal to the one or more UEs. The BS may also include where the transceiver is further configured to transmit the communication signal by transmitting the communication signal using at least one of a layer one (L1) signal or a media access control element (MAC CE) signal. The BS may also include where the transceiver is further configured to transmit, to the one or more UEs, sleep mode configuration information via a radio resource control (RRC) message. The BS may also include where the transceiver is further configured to transmit the communication signal by transmitting a start signal indicating a start of the sleep mode period. The BS may also include where the transceiver is further configured to transmit the communication signal by transmitting an indication of a length of the sleep mode period. The BS may also include where the transceiver is further configured to transmit, to the one or more UEs, a stop signal indicating an end of the sleep mode period. The BS may also include where the processor is further configured to determine to enter the sleep mode by receiving, from the one or more UEs, an uplink (UL) data status; and determining a start of the sleep mode period based on the received UL data status. The BS may also include where the transceiver is further configured to transmit, to the one or more UEs, a request for the one or more UEs to transmit the UL data status to the BS.

Further embodiments of the present disclosure include a user equipment (UE) including a transceiver configured to receive, from a base station (BS), a communication signal indicating that the BS will enter a sleep mode for a sleep mode period; and a processor configured to refrain, during one or more sleep windows of the sleep mode period, from performing uplink communications.

The UE may also include where the transceiver is further configured to communicate, with the BS, at least one of an uplink communication signal or a downlink communication signal during one or more active windows of the sleep mode period. The UE may also include where the transceiver is further configured to receive the communication signal by receiving a broadcast from the BS. The UE may also include where the transceiver is further configured to receive the communication signal by receiving the communication signal via at least one of a layer one (L1) signal or a media access control element (MAC CE) signal. The UE may also include where the transceiver is further configured to receive, from the BS, sleep mode configuration information via a radio resource control (RRC) message. The UE may also include where the transceiver is further configured to receive the communication signal by receiving a start signal indicating a start of the sleep mode period. The UE may also include where the transceiver is further configured to receive, from the BS, a request to transmit an uplink (UL) data status to the BS; and transmit, to the BS, the UL data status, where a start of the sleep mode period is at least partially based on the UL data status. The UE may also include where the processor is further configured to synchronize, during at least one of the one or more sleep windows of the sleep mode period, timing with the BS. The UE may also include where the transceiver is further configured to receive, from the BS, a system information signal including sleep mode information associated with the BS, and where the processor is further configured to perform, with the BS, a random access procedure based on the sleep mode information.

Further embodiments of the present disclosure include a non-transitory computer-readable medium having program code recorded thereon, the program code including code for causing a base station (BS) of a wireless communication network to determine to enter a sleep mode; code for causing the BS to transmit, to one or more user equipment (UEs) of the wireless communication network, a communication signal indicating that the BS will enter the sleep mode; and code for causing the BS to operate in the sleep mode for a sleep mode period.

The non-transitory computer-readable medium may also include where the code for causing the BS to operate in the sleep mode is further configured to turn off power to one or more components of the BS. The non-transitory computer-readable medium may also include where the code for causing the BS to turn off power to one or more components of the BS is further configured to turn off power to at least one of a radio frequency (RF) processing component, a baseband processing component, or an upper layer processing component. The non-transitory computer-readable medium may also include where the code for causing the BS to operate in the sleep mode is further configured to transmit a downlink system information signal. The non-transitory computer-readable medium may also include where the downlink system information signal indicates a random access channel (RACH) resource, and where the code for causing the BS to operating in the sleep mode is further configured to receiving, by the BS from a second UE different from the one or more UEs, a RACH preamble signal based on the RACH resource. The non-transitory computer-readable medium may also include where the code for causing the BS to operate in the sleep mode is further configured to periodically switch between a sleep window of the sleep mode period and an active window of the sleep mode period. The non-transitory computer-readable medium may also include where the code for causing the BS to operate in the sleep mode is further configured to refrain, during the sleep window of the sleep mode period, from performing uplink and downlink communications; and perform, during the active window of the sleep mode period, at least one of an uplink communication or a downlink communication. The non-transitory computer-readable medium may also include where the code for causing the BS to transmit the communication signal is further configured to broadcast the communication signal to the one or more UEs. The non-transitory computer-readable medium may also include where the code for causing the BS to transmit the communication signal is further configured to transmit the communication signal using at least one of a layer one (L1) signal or a media access control element (MAC CE) signal. The non-transitory computer-readable medium may also include code for causing the BS to transmit, to the one or more UEs, sleep mode configuration information via a radio resource control (RRC) message. The non-transitory computer-readable medium may also include where the code for causing the BS to transmit the communication signal is further configured to transmit a start signal indicating a start of the sleep mode period. The non-transitory computer-readable medium may also include where the code for causing the BS to transmit the communication signal is further configured to transmit an indication of a length of the sleep mode period. The non-transitory computer-readable medium may also include code for causing the BS to transmit, to the one or more UEs, a stop signal indicating an end of the sleep mode period. The non-transitory computer-readable medium may also include where the code for causing the BS to determine to enter the sleep mode is further configured to receive, from the one or more UEs, an uplink (UL) data status; and determine a start of the sleep mode period based on the received UL data status. The non-transitory computer-readable medium may also include code for causing the BS to transmit, to the one or more UEs, a request for the one or more UEs to transmit the UL data status to the BS.

Further embodiments of the present disclosure include a non-transitory computer-readable medium having program code recorded thereon, the program code including code for causing a user equipment (UE) to receiving, from a base station (BS), a communication signal indicating that the BS will enter a sleep mode for a sleep mode period; code for causing the UE to refrain, during one or more sleep windows of the sleep mode period, from performing uplink communications; and code for causing the UE to synchronize, during at least one of the one or more sleep windows of the sleep mode period, timing with the BS.

The non-transitory computer-readable medium may also include code for causing the UE to communicate, by the UE with the BS, at least one of an uplink communication signal or a downlink communication signal during one or more active windows of the sleep mode period. The non-transitory computer-readable medium may also include where the code for causing the UE to receive the communication signal is further configured to receive a broadcast from the BS. The non-transitory computer-readable medium may also include where the code for causing the UE to receive the communication signal is further configured to receive the communication signal via at least one of a layer one (L1) signal or a media access control element (MAC CE) signal. The non-transitory computer-readable medium may also include code for causing the UE to receive, from the BS, sleep mode configuration information via a radio resource control (RRC) message. The non-transitory computer-readable medium may also include where the code for causing the UE to receive the communication signal is further configured to Receive a start signal indicating a start of the sleep mode period. The non-transitory computer-readable medium may also include where the code for causing the UE to receive the communication signal is further configured to receive an indication of a length of the sleep mode period. The non-transitory computer-readable medium may also include where the code for causing the UE to receive the communication signal is further configured to receive an indication of a length of the one or more sleep windows of the sleep mode period. The non-transitory computer-readable medium may also include code for causing the UE to receive, from the BS, a stop signal indicating an end of the sleep mode period. The non-transitory computer-readable medium may also include code for causing the UE to receive, from the BS, a request to transmit an uplink (UL) data status to the BS; and code for causing the UE to transmit, to the BS, the UL data status, where a start of the sleep mode period is at least partially based on the UL data status. The non-transitory computer-readable medium may also include code for causing the UE to synchronize, during at least one of the one or more sleep windows of the sleep mode period, timing with the BS. The non-transitory computer-readable medium may also include code for causing the UE to receive, from the BS, a system information signal including sleep mode information associated with the BS; and code for causing the UE to perform, with the BS, a random access procedure based on the sleep mode information.

Further embodiments of the present disclosure include a base station (BS) of a wireless communication network, including means for determining to enter a sleep mode; means for transmitting, to one or more user equipment (UEs) of the wireless communication network, a communication signal indicating that the BS will enter the sleep mode; and means for operating in the sleep mode for a sleep mode period.

The BS may also include where the means for operating in the sleep mode is further configured to turn off power to one or more components of the BS. The BS may also include where the means for turning off power to one or more components of the BS is further configured to turn off power to at least one of a radio frequency (RF) processing component, a baseband processing component, or an upper layer processing component. The BS may also include where the means for operating in the sleep mode is further configured to transmit a downlink system information signal. The BS may also include where the downlink system information signal indicates a random access channel (RACH) resource, and where the means for operating in the sleep mode is further configured to receiving, by the BS from a second UE different from the one or more UEs, a RACH preamble signal based on the RACH resource. The BS may also include where the means for operating in the sleep mode is further configured to periodically switch between a sleep window of the sleep mode period and an active window of the sleep mode period. The BS may also include where the means for operating in the sleep mode is further configured to refrain, during the sleep window of the sleep mode period, from performing uplink and downlink communications; and perform, during the active window of the sleep mode period, at least one of an uplink communication or a downlink communication. The BS may also include where the means for transmitting the communication signal is further configured to broadcast the communication signal to the one or more UEs. The BS may also include where the means for transmitting the communication signal is further configured to transmit the communication signal using at least one of a layer one (L1) signal or a media access control element (MAC CE) signal. The BS means for transmitting, to the one or more UEs, sleep mode configuration information via a radio resource control (RRC) message. The BS may also include where the means for transmitting the communication signal is further configured to transmit a start signal indicating a start of the sleep mode period. The BS may also include where the means for transmitting the communication signal is further configured to transmit an indication of a length of the sleep mode period. The BS means for transmitting, to the one or more UEs, a stop signal indicating an end of the sleep mode period. The BS may also include where the means for determining to enter the sleep mode is further configured to receive, from the one or more UEs, an uplink (UL) data status; and determine a start of the sleep mode period based on the received UL data status. The BS means for transmitting, to the one or more UEs, a request for the one or more UEs to transmit the UL data status to the BS.

Further embodiments of the present disclosure include a base station (BS) of a wireless communication network, including means for determining to enter a sleep mode; means for transmitting, to one or more user equipment (UEs) of the wireless communication network, a communication signal indicating that the BS will enter the sleep mode; and means for operating in the sleep mode for a sleep mode period.

The BS may also include where the means for operating in the sleep mode is further configured to turn off power to one or more components of the BS. The BS may also include where the means for turning off power to one or more components of the BS is further configured to turn off power to at least one of a radio frequency (RF) processing component, a baseband processing component, or an upper layer processing component. The BS may also include where the means for operating in the sleep mode is further configured to transmit a downlink system information signal. The BS may also include where the downlink system information signal indicates a random access channel (RACH) resource, and where the means for operating in the sleep mode is further configured to receiving, by the BS from a second UE different from the one or more UEs, a RACH preamble signal based on the RACH resource. The BS may also include where the means for operating in the sleep mode is further configured to periodically switch between a sleep window of the sleep mode period and an active window of the sleep mode period. The BS may also include where the means for operating in the sleep mode is further configured to refrain, during the sleep window of the sleep mode period, from performing uplink and downlink communications; and perform, during the active window of the sleep mode period, at least one of an uplink communication or a downlink communication. The BS may also include where the means for transmitting the communication signal is further configured to broadcast the communication signal to the one or more UEs. The BS may also include where the means for transmitting the communication signal is further configured to transmit the communication signal using at least one of a layer one (L1) signal or a media access control element (MAC CE) signal. The BS may also include means for transmitting, to the one or more UEs, sleep mode configuration information via a radio resource control (RRC) message. The BS may also include where the means for transmitting the communication signal is further configured to transmit a start signal indicating a start of the sleep mode period. The BS may also include where the means for transmitting the communication signal is further configured to transmit an indication of a length of the sleep mode period. The BS may also include means for transmitting, to the one or more UEs, a stop signal indicating an end of the sleep mode period. The BS may also include where the means for determining to enter the sleep mode is further configured to receive, from the one or more UEs, an uplink (UL) data status; and determine a start of the sleep mode period based on the received UL data status. The BS may also include means for transmitting, to the one or more UEs, a request for the one or more UEs to transmit the UL data status to the BS.

Further embodiments of the present disclosure include a user equipment (UE) including means for receiving, from a base station (BS), a communication signal indicating that the BS will enter a sleep mode for a sleep mode period; means for refraining, during one or more sleep windows of the sleep mode period, from performing uplink communications; and means for synchronizing, during at least one of the one or more sleep windows of the sleep mode period, timing with the BS.

The UE may also include means for communicating, by the UE with the BS, at least one of an uplink communication signal or a downlink communication signal during one or more active windows of the sleep mode period. The UE may also include where the means for receiving the communication signal is further configured to receive a broadcast from the BS. The UE may also include where the means for receiving the communication signal is further configured to receive the communication signal via at least one of a layer one (L1) signal or a media access control element (MAC CE) signal. The UE may also include means for receiving, from the BS, sleep mode configuration information via a radio resource control (RRC) message. The UE may also include where the means for receiving the communication signal is further configured to Receive a start signal indicating a start of the sleep mode period. The UE may also include where the means for receiving the communication signal is further configured to receive an indication of a length of the sleep mode period. The UE may also include where the means for receiving the communication signal is further configured to receive an indication of a length of the one or more sleep windows of the sleep mode period. The UE may also include means for receiving, from the BS, a stop signal indicating an end of the sleep mode period. The UE may also include means for receiving, from the BS, a request to transmit an uplink (UL) data status to the BS; and means for transmitting, to the BS, the UL data status, where a start of the sleep mode period is at least partially based on the UL data status. The UE may also include means for synchronizing, during at least one of the one or more sleep windows of the sleep mode period, timing with the BS. The UE may also include means for receiving, from the BS, a system information signal including sleep mode information associated with the BS; and means for performing, with the BS, a random access procedure based on the sleep mode information.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a base station (BS) of a wireless communication network, to enter a sleep mode;
   receiving, by the BS from one or more user equipment (UEs), an uplink (UL) data status comprising a buffer status of the one or more UEs;
   determining, by the BS, a start of a sleep mode period for the BS based on the received UL data status;
   transmitting, by the BS to the one or more UEs, a communication signal indicating that the BS will enter the sleep mode and the start of the sleep mode period; and
   operating, by the BS, in the sleep mode for the sleep mode period.

2. The method of claim 1, wherein the operating in the sleep mode includes turning off power to one or more components of the BS, the one or more components including at least one of a radio frequency (RF) processing component, a baseband processing component, or an upper layer processing component of the BS.

3. The method of claim 1, wherein the operating in the sleep mode further includes:
   transmitting, by the BS, a downlink system information signal indicating a random access channel (RACH) resource; and
   receiving, by the BS from a second UE different from the one or more UEs, a RACH preamble signal based on the RACH resource.

4. The method of claim 1, wherein the operating in the sleep mode includes:
   periodically switching, by the BS, between a sleep window of the sleep mode period and an active window of the sleep mode period;
   refraining, by the BS during the sleep window of the sleep mode period, from performing uplink and downlink communications; and
   performing, by the BS during the active window of the sleep mode period, at least one of an uplink communication or a downlink communication.

5. The method of claim 1, wherein the transmitting the communication signal includes:
   transmitting the communication signal to the one or more UEs using at least one of a layer one (L1) signaling, a media access control element (MAC CE) signaling, radio resource control (RRC) signaling, or a broadcast signaling.

6. The method of claim 1, further comprising:
   transmitting, by the BS to the one or more UEs, sleep mode configuration information via a radio resource control (RRC) message.

7. The method of claim 1, wherein the transmitting the communication signal further includes:

transmitting, by the BS to the one or more UEs, an indication of at least one of a length of the sleep mode period, or an end of the sleep mode period.

8. The method of claim 1, wherein
the received UL data status further comprises a power supply condition of the one or more UEs.

9. The method of claim 1, further comprising:
transmitting, by the BS to the one or more UEs, a request for the one or more UEs to transmit the UL data status to the BS.

10. A method of wireless communication, comprising:
transmitting, by a user equipment (UE) to a base station (BS), an uplink (UL) data status comprising a buffer status of the UE;
receiving, by the UE from the BS, a communication signal indicating that the BS will enter a sleep mode for a sleep mode period and a start of the sleep mode period, the start of the sleep mode period being based on the UL data status; and
refraining, by the UE during one or more sleep windows of the sleep mode period, from performing uplink communications.

11. The method of claim 10, further comprising:
communicating, by the UE with the BS, at least one of an uplink communication signal or a downlink communication signal during one or more active windows of the sleep mode period.

12. The method of claim 10, wherein the receiving the communication signal includes:
receiving the communication signal via at least one of a layer one (L1) signaling, a media access control element (MAC CE) signaling, a radio resource control (RRC) signaling, or a broadcast signaling.

13. The method of claim 10, further comprising:
receiving, by the UE from the BS, sleep mode configuration information via a radio resource control (RRC) message.

14. The method of claim 10, wherein the receiving the communication signal further includes:
receiving an indication of at least one of a length of the sleep mode period, a length of the one or more sleep windows of the sleep mode period, or an end of the sleep mode period.

15. The method of claim 10, further comprising:
receiving, by the UE from the BS prior to the transmitting the UL data status, a request for the UL data status.

16. The method of claim 10, further comprising:
synchronizing, by the UE, during at least one of the one or more sleep windows of the sleep mode period, timing with the BS.

17. The method of claim 10, further comprising:
receiving, by the UE from the BS, a system information signal including sleep mode information associated with the BS; and
performing, by the UE with the BS, a random access procedure based on the sleep mode information.

18. A base station (BS) of a wireless communication network, comprising:
a processor configured to:
 determine to enter a sleep mode;
 determine a start of a sleep mode period for the BS based on an uplink (UL) data status comprising a buffer status of one or more user equipment (UEs); and
 operate in the sleep mode for the sleep mode period based on the determined start of the sleep mode period; and a transceiver configured to:
 receive, from the one or more UEs prior to determining the start of the sleep mode period, the UL data status comprising the buffer status of the one or more UEs; and
 transmit, to the one or more UEs, a communication signal indicating that the BS will enter the sleep mode and the start of the sleep mode period.

19. The BS of claim 18, further comprising:
at least one of a radio frequency (RF) processing component, a baseband processing component, or an upper layer processing component,
wherein the processor is further configured to operate in the sleep mode by:
 turning off power to the at least one of the RF processing component, the baseband processing component, or the upper layer processing component.

20. The BS of claim 18, wherein the processor configured to operate in the sleep mode is configured to:
transmit, via the transceiver, a downlink system information signal indicating a random access channel (RACH) resource; and
receive, via the transceiver, a second UE different from the one or more UEs, a RACH preamble signal based on the RACH resource.

21. The BS of claim 18, wherein the processor configured to operate in the sleep mode is configured to:
periodically switch between a sleep window of the sleep mode period and an active window of the sleep mode period;
refrain, during the sleep window of the sleep mode period, from performing uplink and downlink communications; and
perform, during the active window of the sleep mode period, at least one of an uplink communication or a downlink communication.

22. The BS of claim 18, wherein the transceiver is further configured to:
transmit, to the one or more UEs, sleep mode configuration information via a radio resource control (RRC) message.

23. The BS of claim 18, wherein
the received UL data status further comprises a power supply condition of the one or more UEs.

24. The BS of claim 18, wherein the transceiver is further configured to:
transmit, to the one or more UEs, a request for the one or more UEs to transmit the UL data status to the BS.

25. A user equipment (UE) comprising:
a transceiver configured to:
transmit, to a base station (BS), an uplink (UL) data status comprising a buffer status of the UE; and
receive, from the BS, a communication signal indicating that the BS will enter a sleep mode for a sleep mode period and a start of the sleep mode period, the start of the sleep mode period being based on the UL data status; and
a processor configured to refrain, during one or more sleep windows of the sleep mode period, from performing uplink communications.

26. The UE of claim 25, wherein the transceiver is further configured to:
communicate, with the BS, at least one of an uplink communication signal or a downlink communication signal during one or more active windows of the sleep mode period.

27. The UE of claim 25, wherein the transceiver is further configured to:
receive, from the BS, sleep mode configuration information via a radio resource control (RRC) message.

28. The UE of claim 25, wherein the transceiver is further configured to:
receive, from the BS prior to transmitting the UL data status, a request for the UL data status.

29. The UE of claim 25, wherein the processor is further configured to:
synchronize, during at least one of the one or more sleep windows of the sleep mode period, timing with the BS.

30. The UE of claim 25, wherein:
the transceiver is further configured to:
receive, from the BS, a system information signal including sleep mode information associated with the BS, and
the processor is further configured to:
perform, with the BS, a random access procedure based on the sleep mode information.

31. A user equipment (UE) comprising:
a transceiver configured to:
transmit, to a base station (BS), an uplink (UL) data status comprising a buffer status of the UE; and
receive, from the BS, a communication signal indicating that the BS will enter a sleep mode for a sleep mode period and a start of the sleep mode period, the start of the sleep mode period being based on the UL data status; and
a processor configured to:
refrain, during one or more sleep windows of the sleep mode period, from performing uplink communications; and
maintain synchronization between the UE and the BS during the sleep mode period.

32. The UE of claim 31, wherein the transceiver is further configured to:
communicate, with the BS, at least one of an uplink communication signal or a downlink communication signal during one or more active windows of the sleep mode period.

33. The UE of claim 31, wherein the transceiver is further configured to:
receive, from the BS, sleep mode configuration information via a radio resource control (RRC) message.

34. The UE of claim 31, wherein the transceiver is further configured to:
receive, from the BS prior to transmitting the UL data status, a request for the UL data status.

35. The UE of claim 31, wherein the processor is further configured, as part of maintaining the synchronization, to:
synchronize, during at least one of the one or more sleep windows of the sleep mode period, timing with the BS.

36. The UE of claim 31, wherein:
the transceiver is further configured to receive, from the BS, a system information signal including sleep mode information associated with the BS, and
the processor is further configured to perform, with the BS, a random access procedure based on the sleep mode information.

* * * * *